(12) United States Patent
Barsness et al.

(10) Patent No.: US 8,171,047 B2
(45) Date of Patent: *May 1, 2012

(54) QUERY EXECUTION AND OPTIMIZATION UTILIZING A COMBINING NETWORK IN A PARALLEL COMPUTER SYSTEM

(75) Inventors: Eric L. Barsness, Pine Island, MN (US); David L. Darrington, Rochester, MN (US); Amanda E. Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 885 days.

This patent is subject to a terminal disclaimer.

(21) Appl. No.: 11/834,827

(22) Filed: Aug. 7, 2007

(65) Prior Publication Data
US 2009/0043910 A1  Feb. 12, 2009

(51) Int. Cl.
G06F 7/00 (2006.01)
G06F 17/30 (2006.01)

(52) U.S. Cl. ........................ 707/770; 707/966

(58) Field of Classification Search .................. 707/1–3, 707/10, 770, 769, 758, 705, 999.01, 999.001, 707/999.107, 966
See application file for complete search history.

(56) References Cited

U.S. PATENT DOCUMENTS

| | | | |
|---|---|---|---|
| 5,371,852 A * | 12/1994 | Attanasio et al. | 709/245 |
| 5,857,180 A * | 1/1999 | Hallmark et al. | 707/2 |
| 6,081,801 A | 6/2000 | Cochrane et al. | |
| 6,173,332 B1 | 1/2001 | Hickman | |
| 6,460,043 B1 * | 10/2002 | Tabbara et al. | 707/100 |
| 7,343,418 B2 | 3/2008 | Herley | |
| 2002/0143755 A1 | 10/2002 | Wynblatt et al. | |
| 2002/0194173 A1 | 12/2002 | Bjornson et al. | |
| 2002/0198867 A1 | 12/2002 | Lohman et al. | |
| 2003/0037048 A1 | 2/2003 | Kabra et al. | |
| 2005/0097078 A1 | 5/2005 | Lohman et al. | |
| 2005/0165748 A1 | 7/2005 | Ting et al. | |
| 2007/0053283 A1 | 3/2007 | Bidwell et al. | |
| 2008/0028379 A1 * | 1/2008 | Stichnoth | 717/151 |

(Continued)

FOREIGN PATENT DOCUMENTS

JP   2002135330 A  *  5/2002

OTHER PUBLICATIONS

Amsaleg, Laurent et al, "Scrambling Query Plans to Cope With Unexpected Delays", Parallel and Distributed Information Systems, 1996, Fourth International Conference on Miami Beach, FL, USA, Dec. 18-20, 1996, Los Alamitos, CA, USA, IEEE Computer Society, US, Dec. 18, 1996, pp. 208-219.

(Continued)

Primary Examiner — Brent Stace
(74) Attorney, Agent, or Firm — Martin & Associates, LLC; Bret J. Petersen

(57) ABSTRACT

An apparatus and method for a database query optimizer utilizes a combining network to optimize a portion of a query in a parallel computer system with multiple nodes. The efficiency of the parallel computer system is increased by off-loading collective operations on node data to the global combining network. The global combining network performs collective operations such as minimum, maximum, sum, and logical functions such as OR and XOR.

13 Claims, 6 Drawing Sheets

U.S. PATENT DOCUMENTS

2009/0089544 A1    4/2009    Liu

OTHER PUBLICATIONS

Knoblock, Craig A., "Planning, Executing, Sensing, and Replanning for Information Gathering", 1995 URL:http://www.isi.edu/info-agents/papers/knoblock95-ijcai.pdf.

Ives, Zachary G. et al, "An Adaptive Query Execution System for Data Integration", SIGMOD Record, ACM, New York, NY, US, vol. 28, No. 2, Jun. 1, 1999, pp. 299-310.

Getta, Janusz R., "Query Scrambling in Distributed Multidatabase Systems", Database and Expert Systems Applications, 2000, Proceedings of the 11th International Workshop on Sep. 4-8, 2000, Piscataway, NJ, USA, IEEE, Sep. 4, 2000, pp. 647-652.

Vossough, Ehsan et al, "Block Level Query Scrambling Algorithm Within Distributed Multi-Database Environment", Database and Expert Systems Applications, 2001, Proceedings of the 12th International Workshop on Sep. 3-7, 2001, Piscataway, NJ, USA, IEEE, Sep. 3, 2001, pp. 123-127.

Eric L. Barsness, et al, U.S. Appl. No. 11/834,813, "Query Optimization in a Parallel Computer System to Reduce Network Traffic", filed Aug. 7, 2007.

Eric L. Barsness, et al, U.S. Appl. No. 11/834,816, "Query Optimization in a Parallel Computer System with Multiple Networks", Aug. 7, 2007.

Eric L. Barsness, et al, U.S. Appl. No. 11/834, 823, "Query Execution and Optimization with Autonomic Error Recovery from Network Failures in a Parallel Computer System with Multiple Networks", filed Aug. 7, 2007.

Eric L. Barsness, et al, U.S. Appl. No. 12/127,077, "Utilizing Virtual Private Networks to Provide Object Level Security on a Multi-Node Computer System", filed May 27, 2008.

Eric L. Barsness, et al, U.S. Appl. No. 11/861,343, "Inserting Data Into an In-Memory Distributed Nodal Database", filed Sepl. 26, 2007.

Google, Inc. "define: topology—Google Search" Feb. 23, 2010, Google.com, p. 1-2.

* cited by examiner

Network File

| Network ID | Timestamp | Util. | Future Util. | Availability | Latency | Retransmits | |
|---|---|---|---|---|---|---|---|
| NetworkA | 10:00:00 | 50% | 60% | Yes | 10ms | 1% | 310A |
| NetworkB | 10:00:00 | 10% | 10% | Yes | 30ms | 0.5% | 310B |
| NetworkC | 10:00:00 | 0% | 0% | No | 0ms | 0% | 310C |

700

Select max (Salary) from Employees

QUERY EXECUTION AND OPTIMIZATION UTILIZING A COMBINING NETWORK IN A PARALLEL COMPUTER SYSTEM

RELATED APPLICATION

This application is related to a co-filed application to Barsness, et. al., Query Optimization In A Parallel Computer System To Reduce Network Traffic, Ser. No. 11/834,813 filed on Aug. 7, 2007, which is incorporated herein by reference.

This application is related to a co-filed application to Barsness, et. al., Query Optimization In A Parallel Computer System With Multiple Networks, Ser. No. 11/834,816 filed on Aug. 7, 2007, which is incorporated herein by reference.

This application is related to a co-filed application to Barsness, et. al., Query Optimization With Autonomic Error Recovery From Network Failures In A Parallel Computer System With Multiple Networks, Ser. No. 11/834,823 filed on Aug. 7, 2007, which is incorporated herein by reference.

BACKGROUND

1. Technical Field

This disclosure generally relates to database query execution and optimization, and more specifically relates to query execution and optimization while utilizing combining network extensions in a parallel computer system of multiple nodes.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Many large institutional computer users are experiencing tremendous growth of their databases. One of the primary means of dealing with large databases is that of distributing the data across multiple partitions in a parallel computer system. The partitions can be logical or physical over which the data is distributed.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack. The Blue Gene/L supercomputer communicates over several communication networks. The compute nodes are arranged into both a logical tree network and a 3-dimensional torus network. The logical tree network connects the computational nodes so that each node communicates with a parent and one or two children. The torus network logically connects the compute nodes in a three-dimensional lattice like structure that allows each compute node to communicate with its closest 6 neighbors in a section of the computer.

Computer systems such as Blue Gene have a large number of nodes, each with its own processor and memory. This characteristic provides the opportunity to provide an in-memory database, where some portions of the database, or the entire database resides completely in-memory. An in-memory database provides an extremely fast response time for searches or queries of the database. In-memory databases pose new challenges and opportunities for computer databases administrators to utilize the full capability of an in-memory database. In particular, a parallel computer system such as Blue Gene has a combining network, which is hardware that is also referred to as the global combining network or collective network. The global combining network connects the nodes in a tree where each node has one or two children. The global combining network has a built-in arithmetic logic unit (ALU) on each node to perform collective operations on data packets as they move along the tree network. Using the ALU of the global combining network to perform some of the query reduces the load on the node CPUs to increase database performance.

Database query optimizers have been developed that evaluate queries and determine how to best execute the queries based on a number of different factors that affect query performance. On parallel computer systems in the prior art, the database and query optimizer are not able to effectively utilize a combining network while executing a database query. Without a way to more effectively execute and optimize queries, multiple network computer systems will continue to suffer from inefficient utilization of system resources to process database queries.

SUMMARY

A database query optimizer utilizes a combining network to optimize a portion of a query in a networked computer system with multiple nodes. The efficiency of the parallel computer system is increased by offloading collective operations on node data to the global combining network. The global combining network performs collective operations such as minimum, maximum, sum, and logical functions such as OR and XOR.

The disclosed examples herein are directed to a massively parallel computer system with multiple networks but the claims herein apply to any computer system with one or more networks and a number of parallel nodes.

The foregoing and other features and advantages will be apparent from the following more particular description, as illustrated in the accompanying drawings.

BRIEF DESCRIPTION OF DRAWINGS

The disclosure will be described in conjunction with the appended drawings, where like designations denote like elements, and.

DETAILED DESCRIPTION 1.0 Overview

Figure 1:
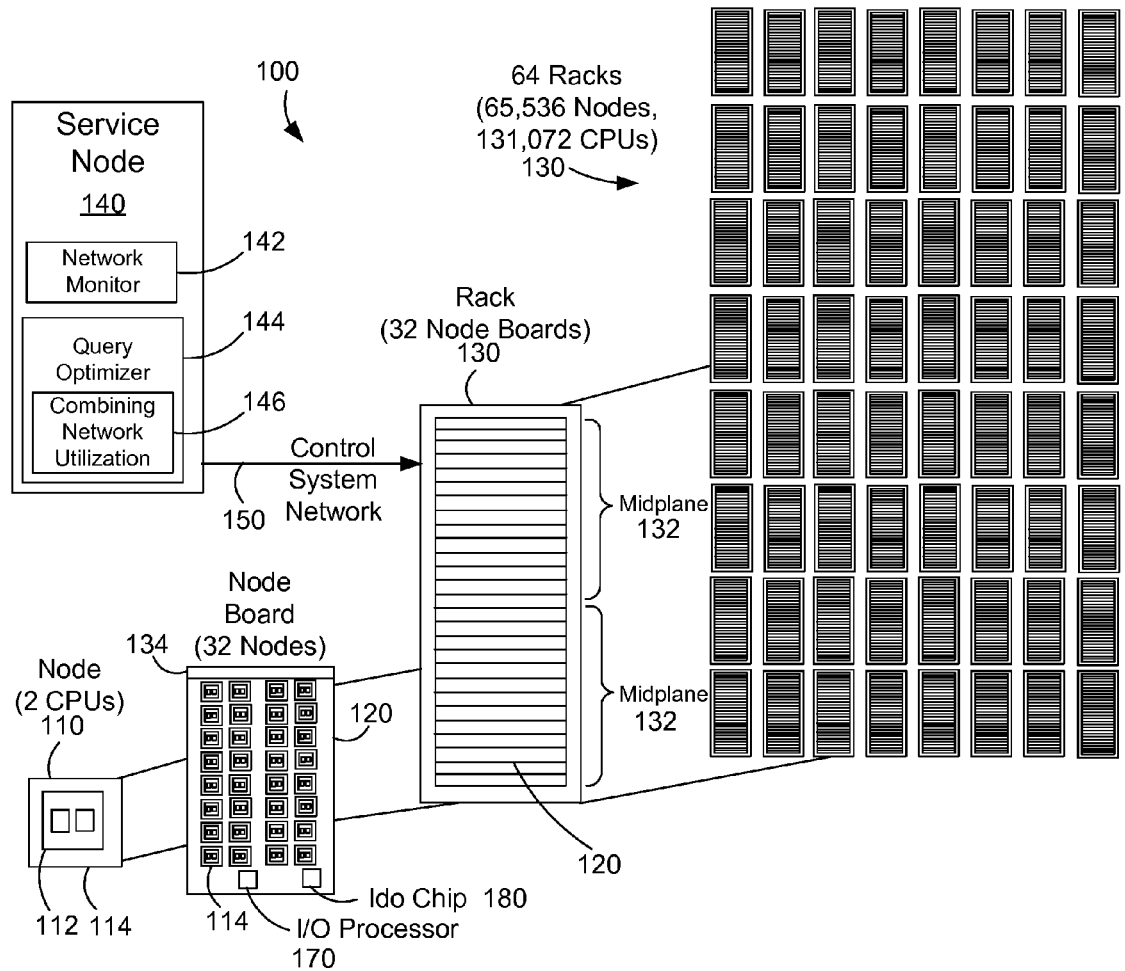
FIG. 1 is a block diagram of a computer with a query optimizer that rewrites a query to take advantage of multiple nodes and multiple network paths of a parallel computer system.

The disclosure and claims herein are related to query optimizers that optimizes how a query accesses a database. For those not familiar with databases, queries, and optimizers, this Overview section will provide additional background information.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces an access plan to execute the query in the database. The access plan may be stored in a plan cache for use with subsequent queries that use the same access plan. In the prior art, a tool known as a query optimizer evaluates expressions in a query and optimizes the query and generates the access plan to access the database.

Query optimizers can also be utilized in a parallel computer system. This application and claims are directed to a database query optimizer that optimizes a query as described further below.

2.0 Detailed Description

In a networked computer system that includes multiple nodes and multiple networks interconnecting the nodes, a database query optimizer utilizes a global combining network to optimize a portion of the query. The examples herein are directed to a query optimizer that executes on a massively parallel computer system such as a BlueGene supercomputer.

The BlueGene supercomputer family developed by IBM includes thousands of compute nodes coupled together via multiple different networks. In the BlueGene architecture, the tree network includes combining network extensions that allows the network to perform collective operations on network data. A query optimizer can now take advantage of the combining network when executing a database query. Known query optimizers take many things into consideration when optimizing a database query, but no known query optimizer has optimized queries by rewriting or optimizing the query to utilize network extensions such as a global combining network to optimize performance of a database query.

The detailed description is given with respect to the Blue Gene/L massively parallel computer being developed by International Business Machines Corporation (IBM). However, those skilled in the art will appreciate that the mechanisms and apparatus of the disclosure and claims apply equally to any parallel computer system with multiple nodes and networks.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 140 to a number of nodes. This network is sometime referred to as the JTAG network since it communicates using the JTAG protocol. All control, test, and bring-up of the compute nodes 110 on the node board 120 is governed through the JTAG port communicating with the service node.

The service node 140 includes a network monitor 142. The network monitor 142 comprises software in the service node and may include software in the nodes. The service node 140 further includes a query optimizer 144. The query optimizer 144 may execute on the service node and/or be loaded into the nodes. The query optimizer 144 utilizes combining network operations (illustrated as "combining network utilization 146" in FIG. 1 and FIG. 2) to optimize a portion of a database query. The combining network operations are performed on data packets over the tree network by the global combining network. The network monitor 142, the query optimizer 144, and the query execution monitor are described more fully below.

The Blue Gene/L supercomputer communicates over several communication networks. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figures 2, 3, 7:
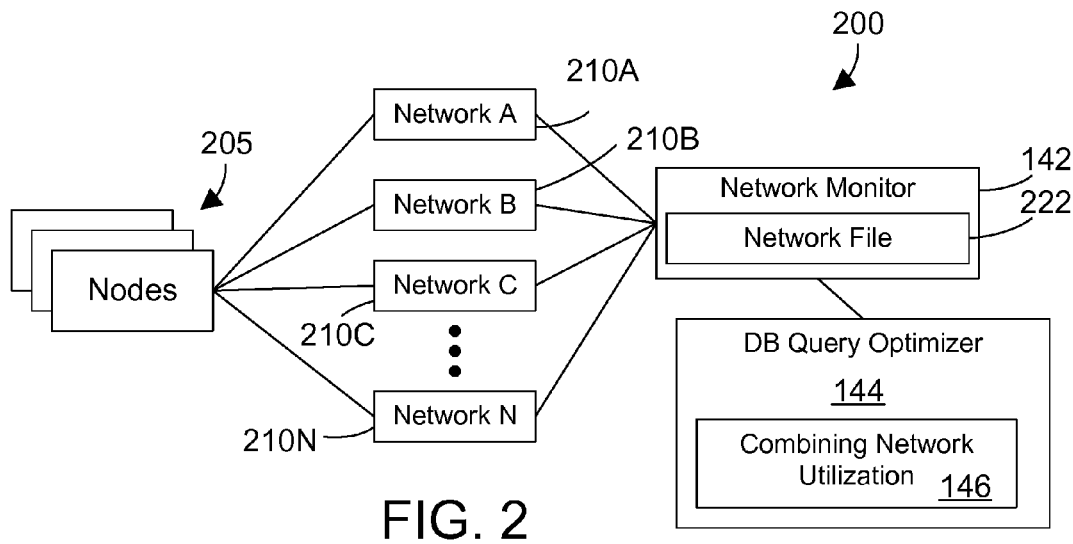
FIG. 2 is a block diagram representing a query optimizer system.
FIG. 3 is a block diagram of a network file record that contains information about network utilization.
FIG. 7 is a query that executes on the database tables shown in FIG. 6 to illustrate an example of optimizing a query to use a global combining network.

Referring to FIG. 2, a system 200 is shown to include multiple nodes 205 coupled together via multiple networks 210A, 210B, 210C, ..., 210N. The system 200 represents a portion of the computer system 100 shown in FIG. 1. The multiple networks are also coupled to a network monitor 142 that monitors the networks and logs the network characteristics in a network file 222. The network monitor 142 provides input data to the query optimizer (or optimizer) 144. In the preferred implementation, the multiple networks are independent networks so a problem with one network does not affect the function of a different network. However, networks that are dependent may also be used.

FIG. 3 illustrates a data structure for storing performance information that can be used by the query optimizer to determine how to optimize queries over multiple nodes and networks in a parallel computer database system. FIG. 3 illustrates a network file 222 that is used by the query optimizer. The network file 222 is maintained by the network monitor 142 (FIGS. 1, 3). Network file 222 preferably includes multiple records as needed to record status information about the networks in the computer system. The illustrated network file 222 has records 310A, 310B, and 310C. The network file records 310A through 310C contain information such as the network identifier (ID), a time stamp, current utilization, future utilization, network availability, latency and the percentage of retransmits. The current utilization represents how busy the network is in terms of bandwidth utilization at the time of the timestamp. Where possible, the future utilization of the network is predicted and stored. The availability of the network indicates whether the network is available or not. Data stored in the network file 222 includes historical and real time information about the network status and loading.

The network monitor executes software routines to determine network traffic and network characteristics, which are then stored in the network file 222. These software routines may be executed on the compute nodes or on the service node 140 shown in FIG. 1. The network monitor determines the current network utilization, and if possible, the future network utilization is predicted. Future network utilization could be predicted based on previous statistics stored in the network file. Predicted future network utilization could also be based on history if the application has been run before or has an identifiable pattern, and could be based on information provided about the application. For example, certain types of applications traditionally execute specific types of queries. Thus, financial applications might execute queries to specific nodes while scientific applications execute queries to all of the nodes. The network latency for each node is determined is also determined. The average latency is computed and logged in the network file 222. The performance of the network may then be determined based on the computed average latency. For example, if the computed average latency exceeds some specified threshold level, the network would be overloaded or not available, but if the computed average latency is less than or equal to the specified threshold level, the network would be available. Note that the determination of network performance by the network monitor relates to whether the network is overloaded, and may be determined using any suitable heuristic or criteria.

Figure 4:
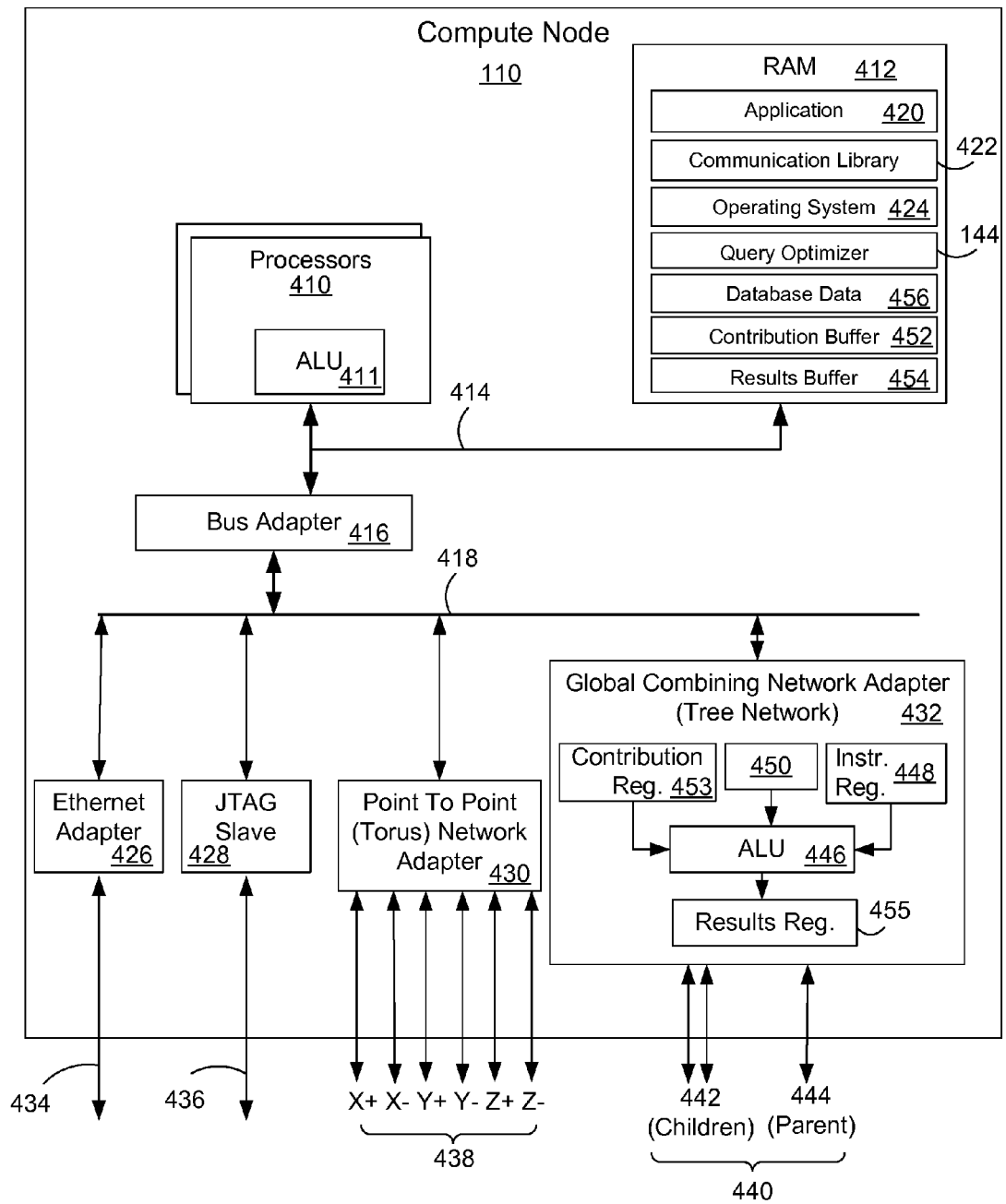
FIG. 4 is a block diagram of a compute node and portions of the global combining network hardware.

FIG. 4 sets forth a block diagram of an exemplary compute node as introduced above and shown in FIG. 1. The compute node 110 of FIG. 4 includes a plurality of computer processors 410, each with an arithmetic logic unit (ALU) 411 as well as random access memory ('RAM') 412. Processors 410 are connected to RAM 412 through a high-speed memory bus 414. Also connected to the high-speed memory bus 414 is a bus adapter 416. The bus adapter 416 connects to an extension bus 418 that connects to other components of the compute node. Stored in RAM 412 is an application program 420, a module of computer program instructions that carries out parallel, user-level data processing using parallel algorithms. Also stored in RAM 412 is a parallel communication library 422, a library of computer program instructions that carry out parallel communications among compute nodes, including point to point operations as well as collective operations. Application program 420 executes collective operations by calling software routines in parallel communications library 422.

Also stored in RAM 412 is an operating system 424, a module of computer program instructions and routines for an application program's access to other resources of the compute node. The quantity and complexity of tasks to be performed by an operating system on a compute node in a parallel computer are typically smaller and less complex than those of an operating system on typical stand alone computer. The operating system may therefore be quite lightweight by comparison with operating systems of general purpose computers, a pared down version as it were, or an operating system developed specifically for operations on a particular parallel computer. Operating systems that may usefully be improved and simplified for use in a compute node include UNIX™, Linux™, Microsoft XP™, AIX™, IBM's i5/OS™, and others as will occur to those of skill in the art.

RAM 412 further includes a query optimizer 144. Query optimizer 144 may work in concert with a portion of the query optimizer 144 residing in the service node 140 as shown in FIG. 1. The query optimizer 144 includes software instructions to perform query optimization including utilizing the global combining network 432, which is described more fully below. A portion of the in-memory database is shown to reside on the compute note 110 as database data 456.

The compute node 110 of FIG. 4 includes several communications adapters 426, 428, 430, 432 for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 4 include a Gigabit Ethernet adapter 426 that couples example compute node 110 for data communications to a Gigabit Ethernet 434. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 4 include a JTAG Slave circuit 428 that couples the compute node 110 for data communications to a JTAG Master circuit over a JTAG network 436. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 436 may efficiently configure processor registers and memory in compute node 110.

The data communications adapters in the example of FIG. 4 include a Point To Point Network Adapter 430 that couples the compute node 110 for data communications to a network 438. In Blue Gene, the Point To Point Network is typically configured as a three-dimensional torus or mesh. Point To Point Adapter 430 provides data communications in six directions on three communications axes, x, y, and z, through six bidirectional links 438: +x, −x, +y, −y, +z, and −z.

The data communications adapters in the example of FIG. 4 include a Global Combining Network Adapter 432 that couples the compute node 110 for data communications to a network 240 configured as a binary tree. Global Combining Network Adapter 432 provides data communications through three bidirectional links: two links 442 to children nodes and one link 444 to a parent node. The Global Combining Network Adapter 432 of each node has additional hardware to support operations on the global combining network as described further below.

The compute node 110 includes a second ALU 446 that is dedicated to the exclusive use of Global Combining Network Adapter 432 for use in performing the arithmetic and logical functions of reduction operations on the Global Combining Network 440. Computer program instructions of a reduction routine in parallel communications library 422 may latch an instruction for an arithmetic or logical function into instruction register 448. When the arithmetic or logical function of a reduction operation is a 'sum' or a 'logical or,' for example, Global Combining Network Adapter 432 may execute the arithmetic or logical operation by use of ALU 411 in processor 410 or, typically much faster, by use of the dedicated ALU 446 using data provided by other nodes on the global combining network 440 and data provided by the processor 410 on the compute node 110. In such a manner, computer program instructions in the parallel communications library 422 may configure the ALU 446 of the adapter 432 to perform a specified function such as a parallel-prefix operation. The compute node 110 may then perform the parallel-prefix operation with the ALU 446 on a global combining network adapter 432 for the global combing network 440 using data provided by nodes on the children network 442 and the compute node 110. The ALU output may then be passed up to the parent node on the parent network 444.

The Global Combining Network Adapter 432 allows the parallel computer to perform collective operations on the compute nodes of a parallel computer system arranged in a binary tree. The collective operations use the contribution register 453, the ALU 446 and the results register 455. The contribution register 453 and the results register 455 can be used to hold a portion of a larger operand held in the RAM 412. One type of collective operation is an all reduce operation. An all reduce operation combines all the elements provided in an input buffer of each processor in the group using a common operation and then returns the combined value in an output buffer on all nodes. An all reduce OR operation is an all reduce operation where the operator on the data is a bitwise "OR" operation, where the "OR" is done on a bit-by-bit basis as is known in the art. In the all reduce OR operation herein, the search information on each node is combined to give a search result for the in-memory database. For example, to perform an all reduce OR operation on the compute node shown in FIG. 4, the contents of a contribution buffer 452 in the RAM 412 is compared with inputs from the children nodes on the links 442 and the result is loaded into the results buffer 454. Since the size of the data is such that the ALU 442 is not able to operate on all the data at once, a portion of the contribution buffer 452 is loaded into a contribution register 453 and the results of the operation is stored in a results register 455 and then passed to the results buffer 454 in RAM 412. The local results in the results buffer 454 of the all reduce "OR" operation are then passed to the parent node. The same operation is then repeated on each node up the tree network as shown in FIG. 5 described further below.

Often when performing arithmetic operations, such as the all reduce "OR" operation or a parallel-prefix operation, the global combining network adapter 432 only serves to combine data received from the children nodes and pass the result up the network 440 to the parent node. Similarly, the global combining network adapter 432 may only serve to transmit data received from the parent node and pass the data down the network 440 to the children nodes. Thus the processors 410 on the compute node 110 are not loaded by ALU 446 transaction to pass data up or down the global combining network 440. A processor 410 may inject the identity element into the dedicated ALU 446 for the particular arithmetic operation being performed in the ALU 446 in order to prevent alteration of the output of the ALU 446 when the node should be modifying the data for the operation. The contribution registers 450 injects an identity element that corresponds to the particular arithmetic operation performed by the ALU. For an "OR" operation this would be a zero. For example, when performing an all reduce "OR" operation, the global combining network adapter 432 performs a bitwise OR on the data received from the children nodes, and the results contributed by the local node. The data contributed by the local node is a null because there was no match found on a search of the local node, the contribution register 450 thus injects zeros because that is the identity element for this operation. This will result in the node passing up to the next node in the tree the same data received from the child nodes.

Figures 5, 6:
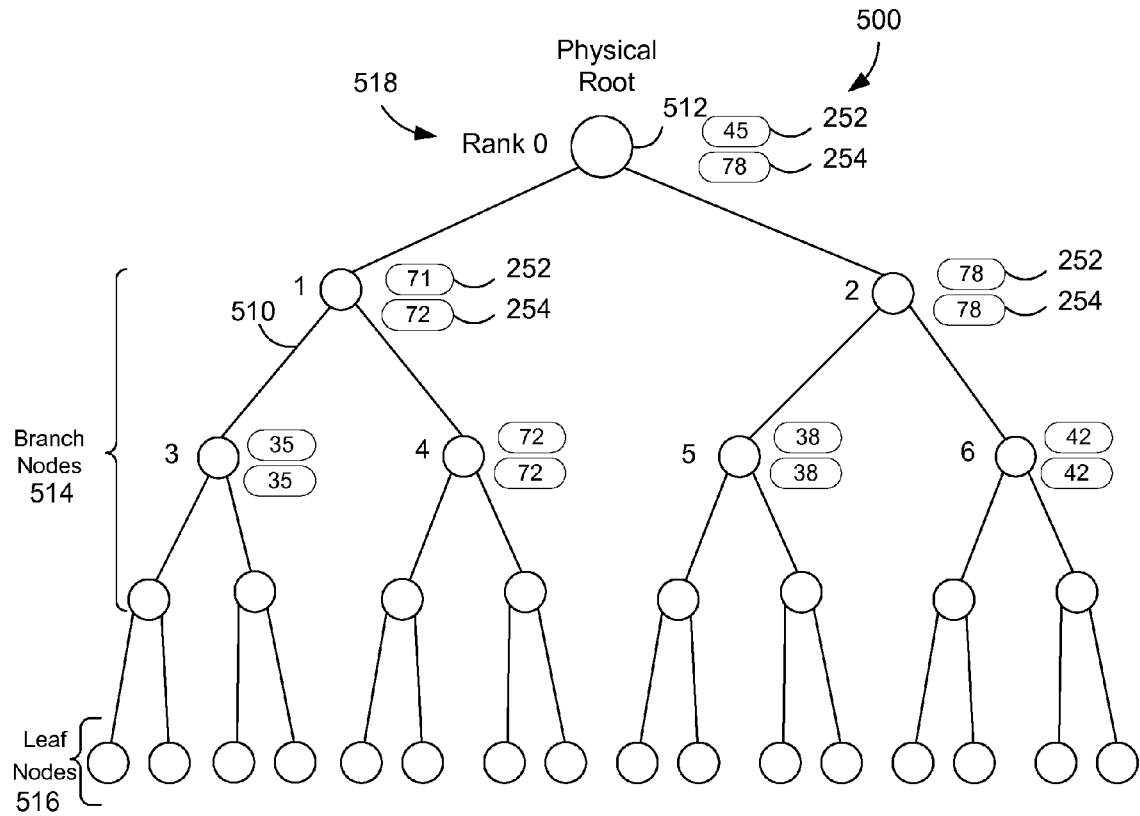
FIG. 5 is a block diagram of a tree network of nodes to illustrate an example of optimizing a query to use network extensions such as the global combining network.
FIG. 6 is a block representing a database table to illustrate an example.

FIG. 5 shows a binary tree 500 illustrating an exemplary global combining network. The example data communications network of FIG. 5 includes data communications links connected to the compute nodes so as to organize the compute nodes as a tree. In the example of FIG. 5, circles represent compute nodes 110 of a parallel computer, and the lines between the circles represent data communications links 510 between compute nodes. The data communications links 510 are implemented with global combining network adapters similar to the one illustrated for example in FIG. 4, with each node typically providing data communications to and from two children nodes and data communications to and from a parent node, with some exceptions. Nodes in the global combining network may be characterized as a physical root node 512, branch nodes 514, and leaf nodes 516. The physical root node 512 has two children but no parent. The leaf nodes 516 each has a parent, but leaf nodes have no children. The branch nodes 514 each has both a parent and two children. The links and compute nodes are thereby organized by this data communications network optimized for collective operations into a binary tree 500. For clarity of explanation, the data communications network of FIG. 5 is illustrated with only 31 compute nodes, but readers will recognize that a global combining network may contain only a few compute nodes or may contain thousands of compute nodes.

The compute nodes 110 of the parallel computer 100 are organized into at least one operational group of compute nodes for collective parallel operations. An operational group of compute nodes is the set of compute nodes upon which a collective parallel operation executes. FIG. 5 illustrates an operational group of compute nodes organized as a global combining network 500. Each compute node in the operational group is assigned a unique rank that identifies the particular compute node in the operational group. In the example of FIG. 5, each node 110 in the tree is assigned a unit identifier or 'rank' 518. A node's rank 518 uniquely identifies the node's location in the tree network for use in both point to point and collective operations in the tree network. The ranks in this example are assigned as integers beginning with 0 assigned to the root node 512, 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments.

In the example of FIG. 5, the global combining network 500 provides data communications among all the nodes 110 in the binary tree to effect collective operations such as a parallel reduction operation. Each ranked node has a contribution buffer 252 for storing the contribution of the ranked compute node and a results buffer 254 for storing results of a parallel reduction operation. Each node performs the reduce operation using the node's contribution and the contributions from the child nodes below that node. That node then passes the result of the operation up to that node's parent node. In such a manner, all the results cascade up to the physical root node 512 into a final result for the entire operation across all the nodes of the tree. Upon the results reaching the physical root node 512, the physical root 512 sends the result of the entire operation back down the tree to each compute node 110 such that the requesting node will have the results data.

A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.' 'MPI' refers to 'Message Passing Interface,' which is a prior art parallel communications library containing modules of computer program instructions for data communications on parallel computers. Examples of prior-art parallel communications libraries that may be improved for parallel-prefix broadcast for a parallel-prefix operation on a parallel computer as describe herein include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation herein.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is a one-to-many collective operation. In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a data type are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

FIGS. 5, 6 and 7 illustrate an example of query optimization utilizing network extension hardware such as the global combining network in the Blue Gene a parallel computer system. FIG. 5 will be used to illustrate how the results of the query is gathered using the global combining network. FIG. 6 represents a database table 600 named Employees. The database table 600 has rows of data 610A-610N where each row holds data for an individual employee. The first column shows the node where the record resides but is not necessarily part of the table. The last row 610N is blank but represents that there may in fact be mores rows in the database but it is abbreviated for clarity. Each row of data 610A-610N includes an employee name, salary and start data of the employee represented in that row.

FIG. 7 shows a query 700 for illustrating an example of query optimization utilizing network extension hardware. The query 700 operates on the Employee 600 table described above with reference to FIG. 6. The query 700 selects the maximum salary from the Employees database table 600. To optimize this query, the query optimizer recognizes that the query has a maximum function (Select max (Salary)) for records in the database stored in the nodes. The query optimizer can then determine that the collective Max operation of the query can be processed on the global combining network as described further below. Offloading this processing to the ALUs on the global combining network rather than performing the function on a single node processor effectively utilizes the network extensions of the global combining network global network.

Again referring to FIGS. 5 through 7, the query optimizer optimizes the query shown in FIG. 7 to use the global combining network that has a database arranged as shown in FIG. 5 with the data shown in FIG. 6. In this example, it is assumed that the database has only Node 0 through Node 6. For each node, a search is conducted on the local database records to find the maximum salary. This maximum salary is placed in the contribution buffer (the top number shown next to each of the nodes). The global combining network is then used to find the maximum salary on the entire database. This is done by each node performing a collective maximum operation with the data supplied from the child nodes compared to the data in the contribution register and placing the maximum in the results buffer. For Nodes 3 through 6, the results buffer has the same value as the contribution buffer since it was assumed that there were no child nodes below these nodes. For Node 1, the contribution register contains the value 71 k because the record for Sam is found on this node, and Sam has a salary of 71 k. The results buffer for Node 1 has a value of 72 k because Node 4 passed up a maximum value of 72, which is the maximum salary found on Node 4 for Betty. This collective operation leads to the final results buffer 254 (FIG. 5) at the physical root node 318 (FIG. 5) to contain the Tom's maximum salary of 78 k found on Node 2.

Figure 8:
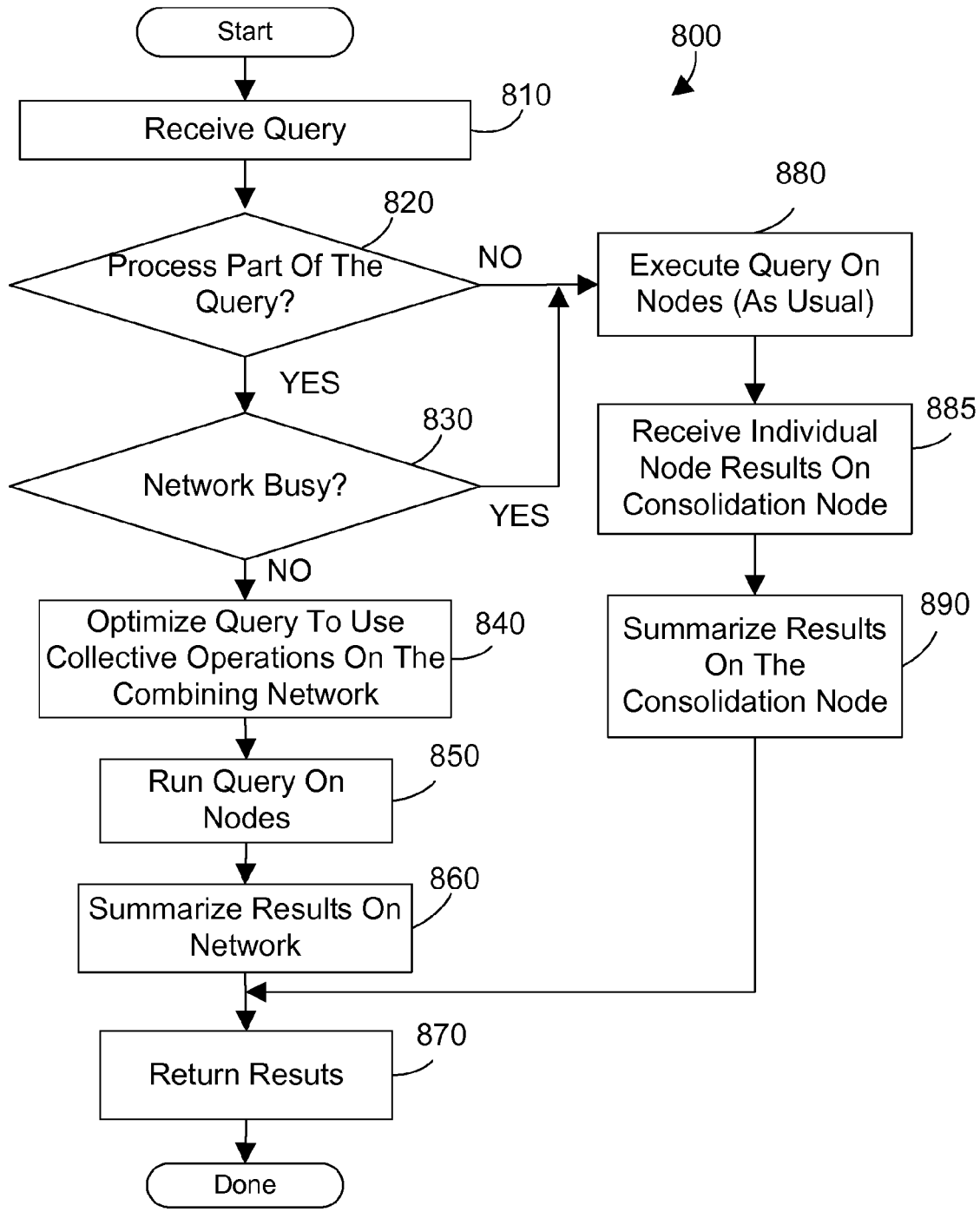
FIG. 8 is a method flow diagram for optimizing a query to use a global combining network on a parallel database system.

FIG. 8 shows a method 800 for a query optimizer to optimize a query to utilize combining network extensions. The method 800 first receives a query (step 810). Next, the query optimizer determines whether part of the query can be processed on the network extension hardware (step 820). If part of the query can be processed on the network extension hardware (step 820=yes) and if the required networks are available (step 830 no) then optimize the query to use collective operations on the combining network (step 840). Note that network file 222 in FIG. 3 could be checked to see if a given network is available. Then run the query on the nodes (step 850), summarize the results on the network (step 860) and return the results on the network to the requesting node (step 870). The method is then done. If part of the query cannot be processed on the network (step 820=no) or if the networks are busy (step 830=yes) then execute the query on the nodes as usual without network extensions (step 880). Then receive the individual node results on the consolidation node (step 885) and summarize the results on the consolidation node (step 890). The consolidation node may be the root node or the node that requested the query. Return the results to the requesting node (step 870) and the method is then done.

Figure 9:
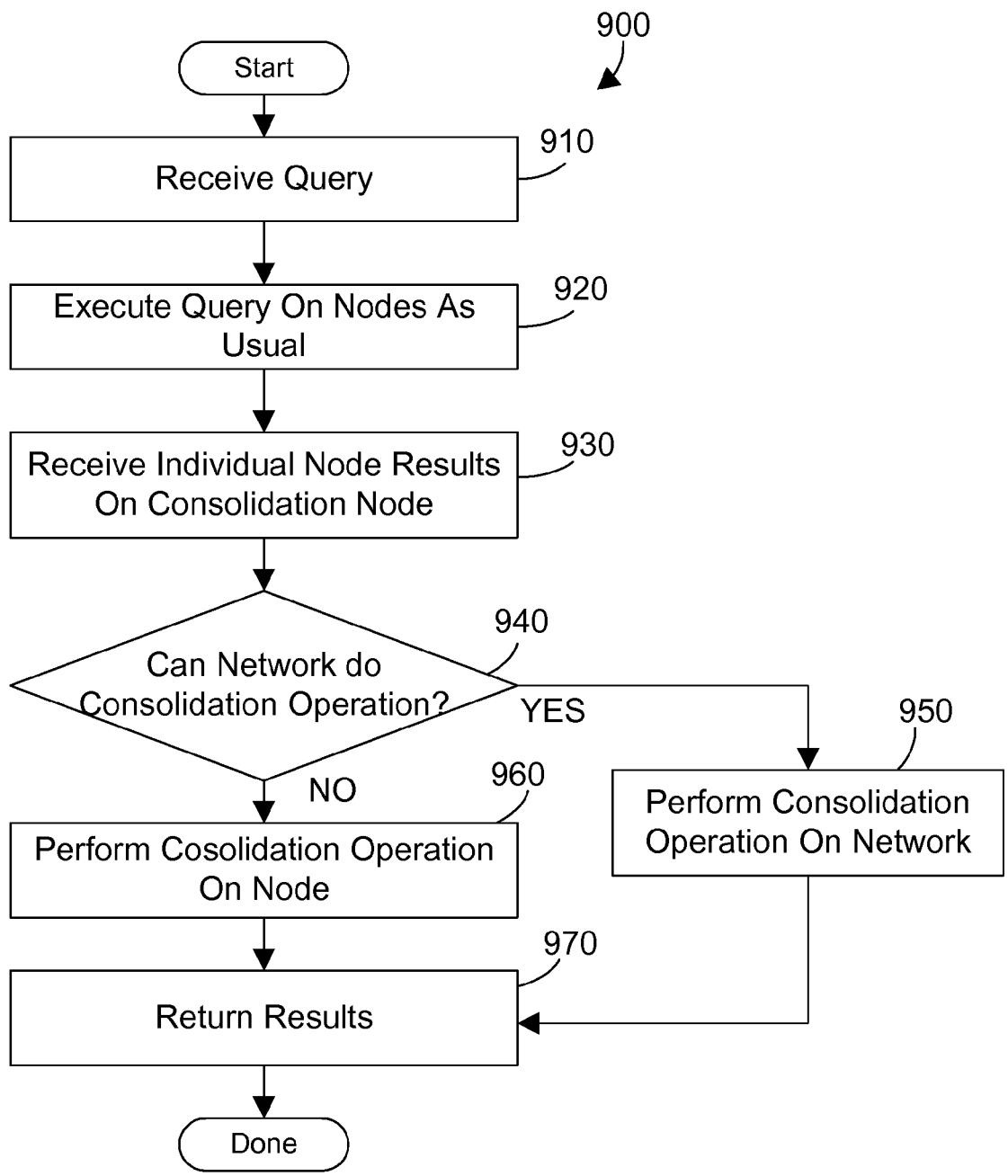
FIG. 9 is another method flow diagram for optimizing a query to use a global combining network on a parallel database system.

FIG. 9 shows another method 900 for a query optimizer to optimize a query to utilize combining network extensions. In method 900, the query results are consolidated using the combining network after broadcasting the results to the nodes. Thus the combining network is used only to consolidate the query results done on the consolidation node. The method 900 first receives a query (step 910). The query is executed on the nodes or node in the usual manner (step 920). Next, the query optimizer determines whether part of the query results can be processed on the network extension hardware to consolidate the results (step 930). If part of the query results can be processed on the network extension hardware (step 940=yes) then perform the consolidation operation on the combining network (step 950). Return the results to the requesting node (step 970) and the method is then done. If part of the query cannot be processed on the network (step 940=no) then perform the consolidation operation on the node as usual without the combining network extensions (step 960). Return the results to the requesting node (step 970) and the method is then done. Note that query 700 in FIG. 7 could be executed using the method 900 in FIG. 9.

The detailed description introduces a method and apparatus for a query optimizer to optimize a portion of a query using combining network extensions. The improved query optimizer allows a database system to better utilize system resources of a parallel computer system with combining network extensions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A computer apparatus comprising:
a plurality of nodes each having a memory and at least one processor with a processor arithmetic logic unit (ALU), wherein the plurality of compute nodes further comprise a combining network adapter (CNA) that is a hardware network adapter for performing collective operations, wherein the CNA comprises an arithmetic logic unit (ALU) that operates on data in registers in the CNA and stores the results in a results buffer, and wherein the CNA contributes to a collective operation by operating on data in the registers received from the child nodes with local data and passing the results in the results buffer to a parent node; wherein the collective operation is an all reduce operation that combines data provided from the child nodes in registers of each CNA using a common operation and then returns a combined value in the results buffer on the plurality of compute nodes;
a combining network comprising a plurality of networks connecting the plurality of nodes through the CNA on the plurality of nodes, and wherein the collective operation is a logical operation that includes a contribution from the CNA of connected nodes on the combining network;
a database residing in the memory of the plurality of nodes; and
a query optimizer that optimizes a query to the database to utilize the combining network and the CNA on the plurality of nodes to perform the collective operation to process a portion of the query.

2. The computer apparatus of claim 1 wherein the collective operation is chosen from the following: minimum, maximum, sum, product, bitwise OR, logical OR, bitwise AND, logical AND, bitwise XOR, and logical XOR.

3. The computer apparatus of claim 1 further comprising a network file that is used by a network monitor to determine if a network is available, and wherein the network file contains network file information selected from the following: network ID, a timestamp, current utilization, future utilization, availability, latency and retransmits.

4. The computer apparatus of claim 1 wherein the combining network further comprises network connections arranged in a binary tree structure.

5. The computer apparatus of claim 1 further comprising a service node connected to the plurality of nodes that controls the plurality of nodes, and a network monitor that periodically monitors the plurality of networks to determine network loading.

6. A computer implemented method for optimizing a query on a parallel computer system with a combining network comprising the steps of:
receiving a query to an in-memory database on a plurality of compute nodes, wherein the plurality of compute nodes comprise a processor with an arithmetic logic unit (ALU), a memory, and a combining network adapter (CNA) that is a hardware network adapter for performing collective operations, wherein the CNA comprises an arithmetic logic unit (ALU) that operates on data in registers in the CNA and stores the results in a results buffer, and wherein the CNA contributes to a collective operation by operating on data in the registers received from the child nodes with local data and passing the results in the results buffer to a parent node;
determining at least part of the query can be processed with a collective operation on the combining network, wherein the collective operation is an all reduce operation that combines data provided from the child nodes in registers of each CNA using a common operation and then returns a combined value in the results buffer on the plurality of compute nodes, and wherein the combining network comprising a plurality of networks connecting the plurality of nodes;
optimizing the query to process a portion of the query with a collective operation using the combining network and the CNA on the plurality of nodes; and
executing the query using the combining network to provide a result.

7. The computer implemented method of claim 6 wherein the collective operation is chosen from the following: minimum, maximum, sum, product, bitwise OR, logical OR, bitwise AND, logical AND, bitwise XOR, and logical XOR.

8. The computer implemented method of claim 6 further comprising the step of determining if a network of the combining network is busy before optimizing the query to use the combining network.

9. The computer implemented method of claim 8 further comprising the step of accessing a network file by a network monitor to determine if a network is available, and wherein the network file contains network file information selected from the following: network ID, a timestamp, current utilization, future utilization, availability, latency and retransmits.

10. An article of manufacture for executing on a parallel computer system with a combining network on a plurality of compute nodes, the article of manufacture comprising computer program instructions disposed upon a computer recordable medium that, when executed by a computer processor, performs the steps of:
a query optimizer performing the steps of:
receiving a query to an in-memory database on a plurality of compute nodes, wherein the plurality of compute nodes comprise a processor with an arithmetic logic unit (ALU), a memory, and a combining network adapter (CNA) that is a hardware network adapter for performing collective operations, wherein the CNA comprises an arithmetic logic unit (ALU) that operates on data in registers in the CNA and stores the results in a results buffer, and wherein the CNA contributes to a collective operation by operating on data in the registers received from the child nodes with local data and passing the results in the results buffer to a parent node;
determining at least part of the query can be processed with a collective operation on the combining network, wherein the collective operation is an all reduce operation that combines data provided from the child nodes in registers of each CNA using a common operation and then returns a combined value in the results buffer on the plurality of compute nodes, and wherein the combining network comprising a plurality of networks connecting the plurality of nodes;
optimizing the query to process a portion of the query with a collective operation using the combining network and the CNA on the plurality of nodes; and
executing the query using the combining network to provide a result.

11. The article of manufacture of claim 10 wherein the collective operation is chosen from the following: minimum, maximum, sum, product, bitwise OR, logical OR, bitwise AND, logical AND, bitwise XOR, and logical XOR.

12. The computer apparatus of claim 10 further comprising the step of: determining if a network of the combining network is busy before optimizing the query to use the combining network.

13. The computer apparatus of claim 12 further comprising the step of accessing a network file by a network monitor to determine if a network is available, and wherein the network file contains network file information selected from the following: network ID, a timestamp, current utilization, future utilization, availability, latency and retransmits.

* * * * *